United States Patent [19]

Kessler

[11] Patent Number: 4,602,596
[45] Date of Patent: Jul. 29, 1986

[54] RECIPROCATING PISTON-INTERNAL COMBUSTION ENGINE WITH VARIABLE COMPRESSION RATIO

[75] Inventor: Anton Kessler, Mosbach, Fed. Rep. of Germany

[73] Assignee: Audi NSU Auto Union Aktiengesellschaft, Fed. Rep. of Germany

[21] Appl. No.: 699,793

[22] Filed: Feb. 8, 1985

[30] Foreign Application Priority Data

Feb. 8, 1984 [DE] Fed. Rep. of Germany ....... 3404343

[51] Int. Cl.⁴ .............................................. F02D 15/04
[52] U.S. Cl. .............................. 123/78 BA; 123/48 B
[58] Field of Search .............. 123/78 R, 78 B, 78 BA, 123/48 B

[56] References Cited

U.S. PATENT DOCUMENTS 1,526,244  2/1925  Shannon ........................... 123/48 B

FOREIGN PATENT DOCUMENTS 0014154  of 1900  United Kingdom .............. 123/48 B
2108198  5/1983  United Kingdom .............. 123/48 B Primary Examiner—Willis R. Wolfe
Attorney, Agent, or Firm—Kane, Dalsimer, Kane, Sullivan and Kurucz

[57] ABSTRACT

For changing the compression ratio of a reciprocating piston internal combustion engine the piston 3 consists of an outer piston part 7 and an inner piston part 10 which are connected with each other by a thread 13,14. By turning the outer piston part 7 by means of a bushing 18 which is axially fixed, but rotatable around piston axis 15 and which is in engagement with the outer piston part 7 by means of a longitudinal gear 19,20, the outer piston part 7 can be turned steplessly during operation with respect to the inner piston part 10, whereby the outer piston part 7 is displaced along the piston axis 15, thus changing the volume of the operating chamber and thereby the compression ratio.

3 Claims, 3 Drawing Figures

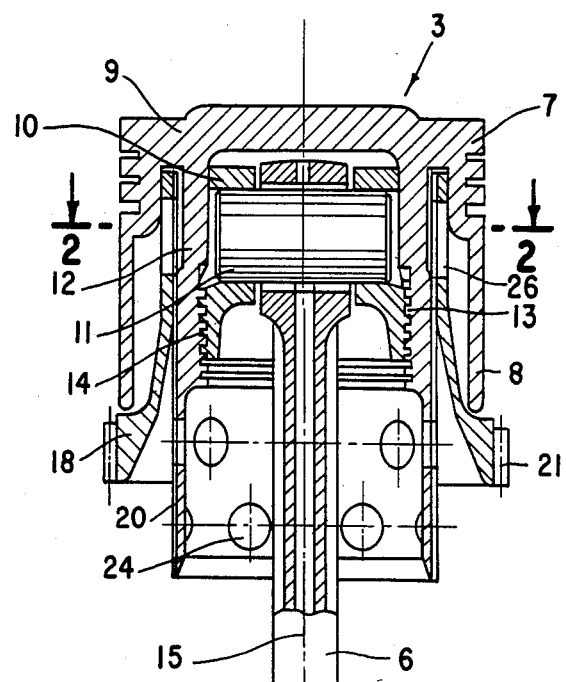
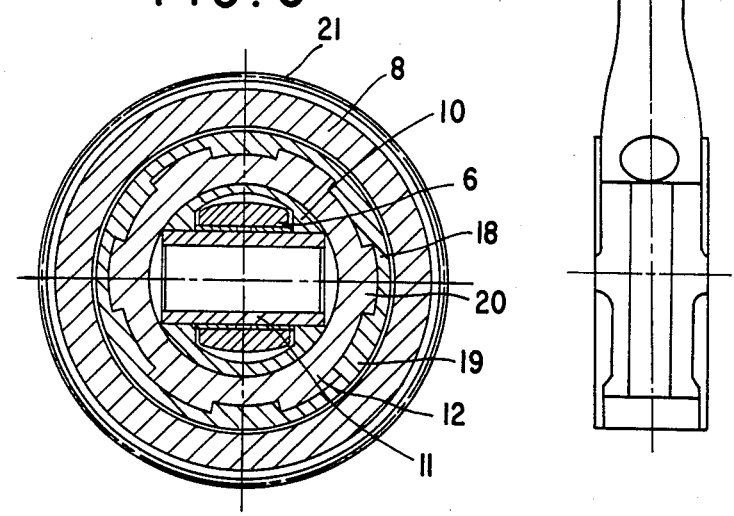

RECIPROCATING PISTON-INTERNAL COMBUSTION ENGINE WITH VARIABLE COMPRESSION RATIO

BACKGROUND OF THE INVENTION

1. Field of Invention

The invention relates to a reciprocating piston internal combustion engine with a variable compression ratio.

2. Description of the Prior Art

In reciprocating piston internal combustion engines with charge control and unvariable compression ratio the compression end pressure and thereby the thermodynamic degree of efficiency is considerably reduced during the partial load operation in view of the reduced charge, so that the specific fuel consumption increases during the partial load operation. In order to prevent this disadvantage it is known to vary the compression ratio by changing the volume of working chamber in such a manner that substantially the same compression and pressure is achieved throughout the total operating range of the internal combustion engine.

In a known reciprocating piston internal combustion engine (DE-PS No. 705 283) in accordance with the preamble of claim 1, a rod is provided for turning the second piston part, which forms the piston head, with respect to the first piston part which is connected with the piston rod, whereby the rod extends through the second piston part and is mounted in the piston axis, while being in engagement with an inner gear on the said piston part by means of gear wheels, further extending through the bushing and non-rotatably connected with an encompassing tube which is provided with an outer gear being in camming engagement with the inner gear of the bushing. The second piston part is turned with respect to the first piston part by turning this rod, thus changing the position of the second piston part with respect to the cylinder head by means of the thread being mounted between these parts, whereby the volume of the working chamber and thereby also the compression ratio is changed. However, this known device is rather expensive, since a double piston rod has to be used in view of the centric disposition of the rod, and in view of the fact that the rod also has to move with the piston movement, so that a complicated mechanism is required for turning the rod.

OBJECTIVES AND SUMMARY OF THE INVENTION

It is therefore an object of the invention to provide a reciprocating piston internal combustion engine of the aforementioned type, wherein a change of the compression ratio by turning the two piston parts relatively toward each other can be performed in a more simplified manner.

This object of the invention is obtained in accordance with the invention by the characterizing features of claim 1.

In the internal combustion engine in accordance with the invention the bushing encompasses the piston rod, so that a normal single piston rod may be used. Since the bushing is directly in contact with the second piston part, however without moving with the piston, the structure is considerably simplified with respect to the state of the art. For example, the bushing may be provided with an outer gear at its end facing away from the piston into which a pinion engages which is mounted on an adjustment shaft. Thereby, the simultaneous changing of the compression ratio of all cylinders can be achieved in a simple manner in an internal combustion engine with a plurality of cylinders being disposed in series, in that the outer gears of the bushings in adjacent cylinders are in engagement with each other, so that by turning one bushing all other bushings are turned in the same manner. The simultaneous turning of the adjustment mechanisms of a plurality of cylinders for the purpose of changing the compression ratio is known from US-PS No. 2 153 691. However, therein the simultaneous turning is performed by means of a rack which is in engagement with the pinion of the adjacent mechanism for the individual cylinders.

BRIEF DESCRIPTION OF THE FIGURES

One exemplified embodiment of the invention will be described in the follwing in conjunction with the drawings.

FIG. 2 is a longitudinal section of a piston in an enlarged scale, and FIG. 3 is a cross section along line 2—2 of FIG. 2.

FIG. 1 illustrates an internal combustion engine with a cylinder block 1 having cylinder bores 2, wherein one each piston 3 is mounted displaceably in a longitudinal direction. A crankshaft 4 is rotatably mounted in crankshaft housing 1a, whereby the piston rods 6 which are associated with the individual pistons are rotatably mounted on the crankshaft pins 5.

Figure 1:
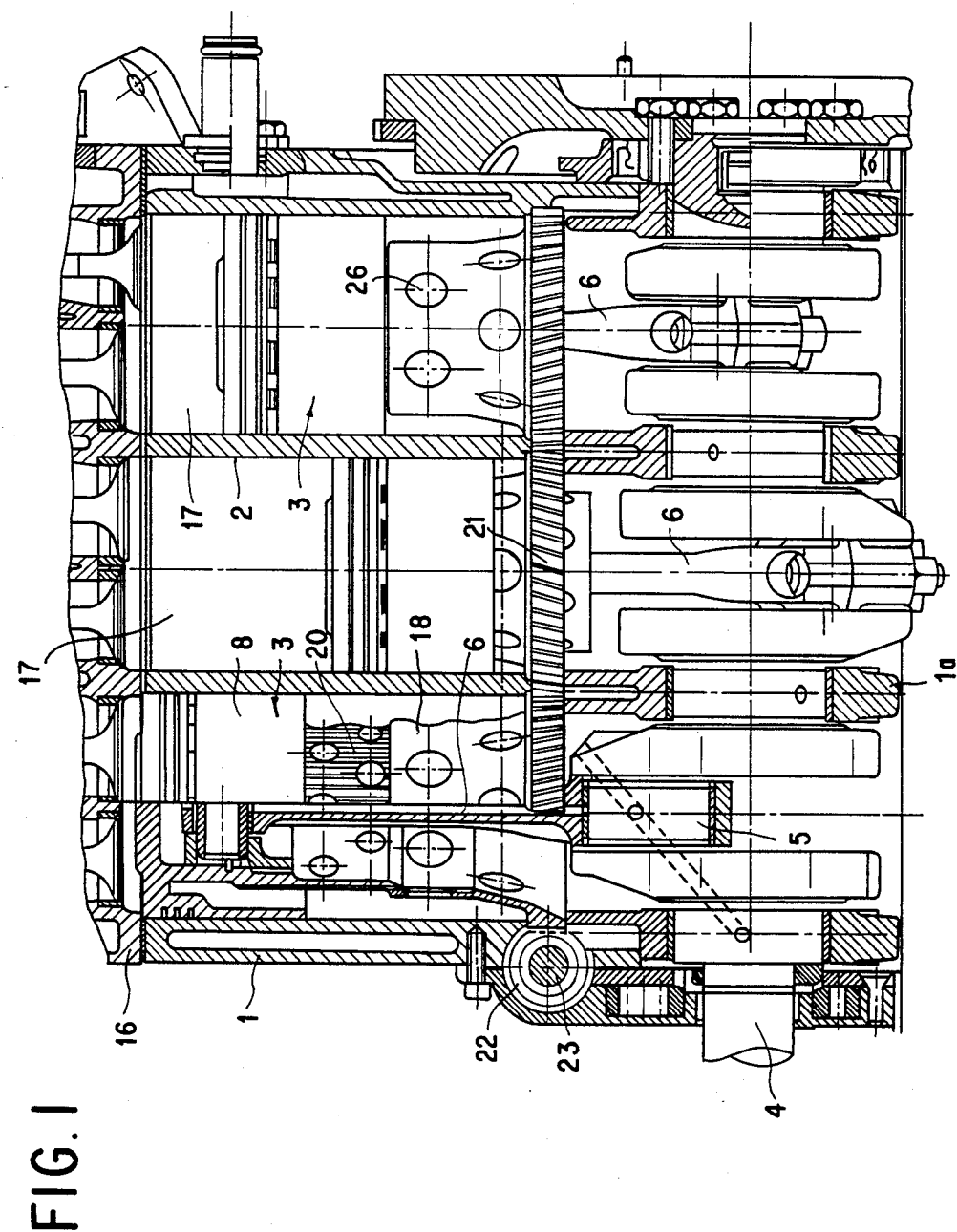
FIG. 1 is a longitudinal section of a multi-cylinder reciprocating piston internal combustion engine, whereby the left cylinder is illustrated partially in TDC and partially in section.

The structure of a piston 3 is illustrated in FIGS. 2 and 3. It consists of two parts, namely an outer piston part 7 with a piston jacket 8, a piston head 9, and an inner piston part 10 which is connected with the piston rod 6 by means of a piston pin 11. Moreover, the outer piston part 7 is provided with an inner wall 12 extending parallel to the piston jacket and which supports on its inner face a flat inner thread 13. The inner piston part 10 is provided with a corresponding outer thread 14 which is in camming engagement with the inner thread 13. When turning the outer piston part 7 relative to the inner piston part 10 the outer piston part 7 displaces in the piston axis 15 relative to the cylinder head 16 which is schematically indicated in FIG. 1, so that the working chamber 17, which is limited by the piston head 9, is changed in volume. This turning of the outer piston part 7 is effected by a bushing 18 which encompasses the inner wall 12 of the outer piston part 7 and which is provided on its inner face with a longitudinal gear 19 extending parallel with respect to piston axis 15 and engaging a corresponding longitudinal gear 20 on the outer side of the inner wall 12 of the outer piston part 7. The bushing 18 is mounted rotatably, but axially stationary between the cylinder block 1 and crankshaft housing 1a and is provided at its lower end with an outer gear 21 into which a worm gear 22 engages being mounted on an adjustment shaft 23. The adjustment shaft 23 can be turned in dependency from operating parameters by means of a pneumatic, hydraulic or electric adjustment member, not shown. The bushing 18 is turned by turning shaft 22 and worm gear 23 and it takes along the outer piston part 7 by means of the longitudinal gear 19,20. Because of thread 13,14, this rotation relative to the outer piston part 10 causes a longitudinal displacement of the outer piston part 7 and thereby a changing of the volume of the working chamber 17 and a corresponding changing of the compression ratio.

As can be seen from FIG. 1, the outer gears 21 of adjacent bushings 18 are in engagement with each other, so that by turning the left bushing 18 of FIG. 1, by means of the adjustment shaft 22, all remaining bushings 18 are turned simultaneously so that the compression ratio of all cylinders can be steplessly changed simultaneously at each rotational speed. Since adjacent bushings 18 rotate in opposite directions, the threads 13, 14 of adjacent pistons also must be pitched in opposite directions.

Apertures 24 and 26 respectively, are provided in the inner wall 12 of outer piston part 7 and in bushing 18, so as to reduce the weight of the piston, and to prevent the formation of a pressure differential between the inside and the outside and also to assure the lubrication of the cylinder wall.

The turning of the adjustment shaft 23 may be performed in dependency from the rotational speed, for example, but also in dependency from signals of a knock sensor, so as to reduce the compression ratio when a knocking combustion occurs.

I claim:

1. Reciprocating piston-internal combustion engine with variable compression ratio, wherein for each cylinder a piston is provided which has a longitudinal axis and a piston head limiting a working chamber, and which is in drive connection with a crankshaft by means of a piston rod and which consists of first and second parts being adjustable relative to each other along the longitudinal piston axis, said first piston part being pivotally connected with the piston rod and supporting an outer thread, and said second piston part being provided with the piston head and being provided with an inner thread engaging the outer thread on the first piston part, and with a device for turning the second piston part, the device comprising a bushing which is mounted for rotation about the piston longitudinal axis, but is axially stationary, and which is provided with an inner gear extending parallel to the longitudiinal axis of the piston, said second piston part being non-rotatably but axially displaceably connected to said bushing, characterized in that the bushing (18) is concentrically mounted between an inner tubular segment (12) and an outer tubular segment (8) of said second piston part (7), and that the inner gear (19) of bushing (18) is in engagement with an outer gear (20) of said inner tubular segment (12) of said second piston part (7).

2. Reciprocating piston-internal combustion engine in accordance with claim 1, characterized in that the bushing (18) and the inner tubular segment (12) of said second piston part (7) are provided with apertures (24,26).

3. Reciprocating piston-internal combustion engine in accordance with claim 1, with an outer gear mounted at the end of said bushing extending from said piston into which a pinion engages being mounted on an adjustment shaft, furthermore with a plurality of cylinders being disposed in series and an adjustment mechanism associated with the piston of one each of said cylinders for changing the compression ratios, characterized in that said outer gear (21) of the bushings (18) of adjacent cylinders are in engagement with each other.

* * * * *